United States Patent

Dacon, Sr.

Patent Number: 5,456,043
Date of Patent: Oct. 10, 1995

[54] TREE CROP CATCH

[76] Inventor: Paul T. Dacon, Sr., 3443 E. Fairmount, #3, Tucson, Ariz. 85716

[21] Appl. No.: 373,764

[22] Filed: Jan. 17, 1995

[51] Int. Cl.⁶ .................................................. A01G 13/02
[52] U.S. Cl. .................... 47/21; 47/20; 56/329
[58] Field of Search ................................. 47/21, 20, 26, 47/21 A, 1 N; 56/329

[56] References Cited

U.S. PATENT DOCUMENTS

| | | | |
|---|---|---|---|
| 1,128,087 | 2/1915 | Winans | 56/329 |
| 1,446,416 | 2/1923 | Curtiss | 47/21 |
| 2,405,452 | 8/1946 | Savage | 47/21 |
| 2,953,870 | 9/1960 | Nelson | 47/21 |
| 3,490,216 | 1/1970 | Gonzalez | 56/329 |
| 4,787,173 | 11/1988 | Lewis | 47/21 |
| 4,901,513 | 2/1990 | Kim et al. | 56/329 |
| 4,969,555 | 11/1990 | Fitzgerald | 47/21 |

FOREIGN PATENT DOCUMENTS 2044715 12/1992 Canada ................................ 47/21

Primary Examiner—Ramon S. Britts
Assistant Examiner—Joanne C. Downs

[57] ABSTRACT

A device adapted to be secured to the trunk of a tree, the device serving to catch the fruit from the trees and protect the fruit from animals, the device including a mesh dome having a rounded closed top and an open bottom. The open bottom defines a circumference, and a slit defines an opening to the mesh dome. The slit is perpendicular to the circumference of the open bottom. The device further includes a circular mesh dish having an outer circumference and an inner centrally located aperture. The outer circumference of the mesh dish matches the circumference of the open bottom of the mesh dome. Furthermore, means for securing are discretely positioned about the outer circumference of the mesh dish. These means for securing function to secure the outer circumference of the mesh dish to the circumference of the open bottom of the mesh dome. A foam ring is positioned within the centrally located aperture of the circular nylon mesh dish. The foam ring is adapted to be secured about the trunk of a tree. A plurality of cords depend from the outer circumference of the mesh dish, with each cord having a first end secured to the outer circumference of the mesh dish and a second end. A plurality of stakes are secured to the second ends of the cords. The stakes are adapted to be inserted into the ground thereby securing the mesh dish, and the mesh dome to the ground.

5 Claims, 4 Drawing Sheets

TREE CROP CATCH

BACKGROUND OF THE INVENTION

1. Field of the Invention

The present invention relates to a tree crop catch and more particularly pertains to a catch for protecting and catching fruit.

2. Description of the Prior Art

The use of collecting netting is known in the prior art. More specifically, collecting nets heretofore devised and utilized for the purpose of collecting crops from trees are known to consist basically of familiar, expected, and obvious structural configurations, notwithstanding the myriad of designs encompassed by the crowded prior art which has been developed for the fulfillment of countless objectives and requirements.

For example U.S. Pat. No. 4,296,568 to Dukes discloses an agricultural crop cover.

U.S. Pat. No. 3,616,629 to Hiroshi Ooka discloses a nut and fruit harvesting system.

U.S. Pat. No. 5,233,788 to Jackson, Jr. discloses an accessible tree protector.

U.S. Pat. No. 4,901,513 to Kim et al. discloses a collection netting for fruits and nuts trees.

U.S. Pat. No. 5,097,624 to Klayman et al. discloses a netting for crop protection.

Lastly, U.S. Pat. No. 3,932,958 to Kistler, Jr. et al. discloses a plant shelter.

In this respect, the tree crop catch according to the present invention substantially departs from the conventional concepts and designs of the prior art, and in doing so provides an apparatus primarily developed for the purpose of collecting and protecting fruit.

Therefore, it can be appreciated that there exists a continuing need for a new and improved tree crop catch which can be used for protecting and collecting fruit. In this regard, the present invention substantially fulfills this need.

SUMMARY OF THE INVENTION

In view of the foregoing disadvantages inherent in the known types of collecting nets now present in the prior art, the present invention provides an improved tree crop catch. As such, the general purpose of the present invention, which will be described subsequently in greater detail, is to provide a new and improved tree crop catch and method which has all the advantages of the prior art and none of the disadvantages.

To attain this, the present invention essentially comprises a device adapted to be secured to the trunk of a tree, the device serving to catch the fruit from the trees and protect the fruit from animals, the device comprising a conical nylon mesh dome having a rounded closed top and an open bottom. The open bottom defines a circumference and a slit defines an opening to the mesh dome. The slit is perpendicular to the circumference of the open bottom, hook and pile fasteners associated with the slit for use in keeping the slit in a closed orientation. A circular nylon mesh dish has an outer circumference and an inner centrally located aperture, a fruit passage area surrounding the centrally located aperture. The fruit passage area is defined by a mesh which allows the fruit of the tree to pass therethrough. The outer circumference of the mesh dish matches the circumference of the open bottom of the mesh dome. A nylon rope is secured to the outer circumference of the mesh dish, the means for securing discretely positioned about the outer circumference of the mesh dish. The means for securing function to secure the outer circumference of the mesh dish to the circumference of the open bottom of the mesh dome. A nylon covered foam ring is positioned within the centrally located aperture of the circular nylon mesh dish, the foam ring adapted to be secured about the trunk of a tree. A plurality of cords depend from the outer circumference of the mesh dish, each cord having a first end secured to the outer circumference of the mesh dish and a second end. A plurality of stakes are included with each of the stakes being secured to the second end of one of the cords. The stakes are adapted to be inserted into the ground thereby securing the mesh dish, and the mesh dome to the ground. A chute is included having a bowl shaped receiving end and a dispensing end, the bowl shaped receiving end adapted to be engaged with the fruit passage area of the mesh dish, the chute functioning such that when fruit falls from the tree it lands upon the mesh dish and rolls down into the fruit passage area, through the fruit passage area and into the bowl shaped receiving end of the chute and out the dispensing end of the chute.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tree crop catch which has all the advantages of the prior art collecting nets and none of the disadvantages.

It is another object of the present invention to provide a new and improved tree crop catch which may be easily and efficiently manufactured and marketed.

It is a further object of the present invention to provide a new and improved tree crop catch which is of durable and reliable constructions.

An even further object of the present invention is to provide a new and improved tree crop catch which is susceptible of a low cost of manufacture with regard to both materials and labor, and which accordingly is then susceptible of low prices of sale to the consuming public, thereby making such tree crop catch economically available to the buying public.

Still yet another object of the present invention is to provide a new and improved tree crop catch which provides in the apparatuses and methods of the prior art some of the advantages thereof, while simultaneously overcoming some of the disadvantages normally associated therewith.

Even still another object of the present invention is to provide a net for collecting and protecting fruit.

Lastly, it is an object of the present invention to provide a device adapted to be secured to the trunk of a tree, the device serving to catch the fruit from the trees and protect the fruit from animals, the device including a mesh dome having a rounded closed top and an open bottom. The open bottom defines a circumference, and a slit defines an opening to the mesh dome. The slit is perpendicular to the circumference of the open bottom. The device further includes a circular mesh dish having an outer circumference and an inner centrally located aperture. The outer circumference of the mesh dish matches the circumference of the open bottom of the mesh dome. Furthermore, means for securing are discretely positioned about the outer circumference of the mesh dish. These means for securing function to secure the outer circumference of the mesh dish to the circumference of the open bottom of the mesh dome. A foam ring is positioned within the centrally located aperture of the circular nylon mesh dish. The foam ring is adapted to be secured about the trunk of a tree. A plurality of cords depend from the outer circumference of the mesh dish, with each cord having a first end secured to the outer circumference of the mesh dish and a second end. A plurality of stakes are secured to the second ends of the cords. The stakes are adapted to be inserted into the ground thereby securing the mesh dish, and the mesh dome to the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
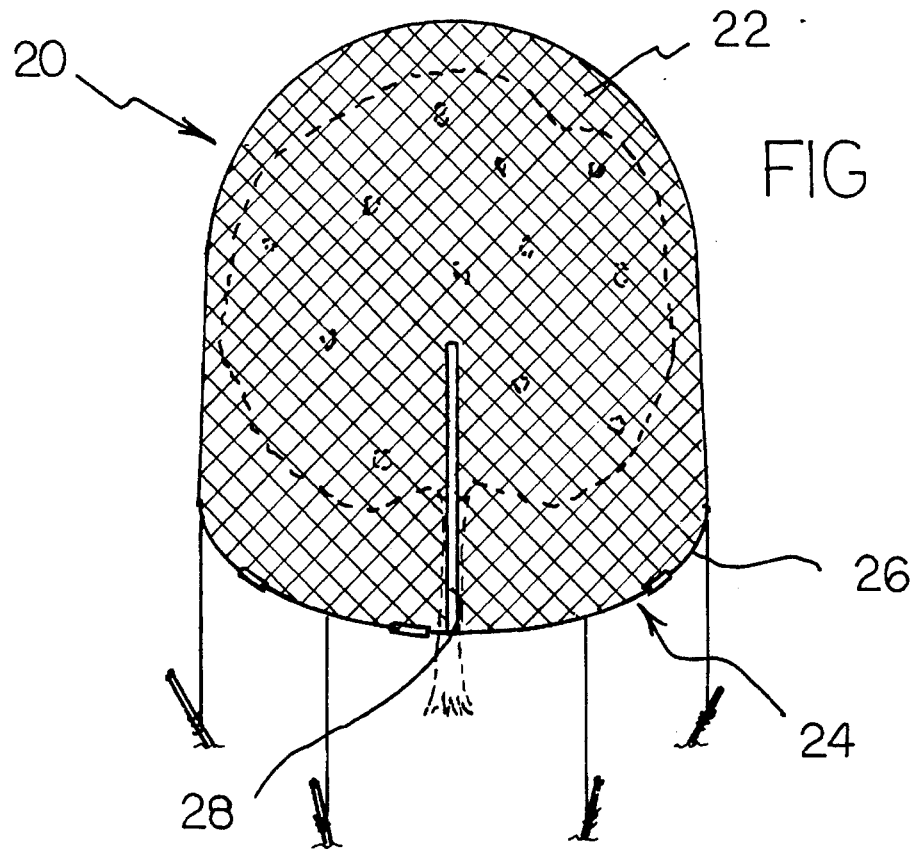
FIG. 1 is a perspective view of the preferred embodiment of the tree crop catch constructed in accordance with the principles of the present invention.
Figure 2:
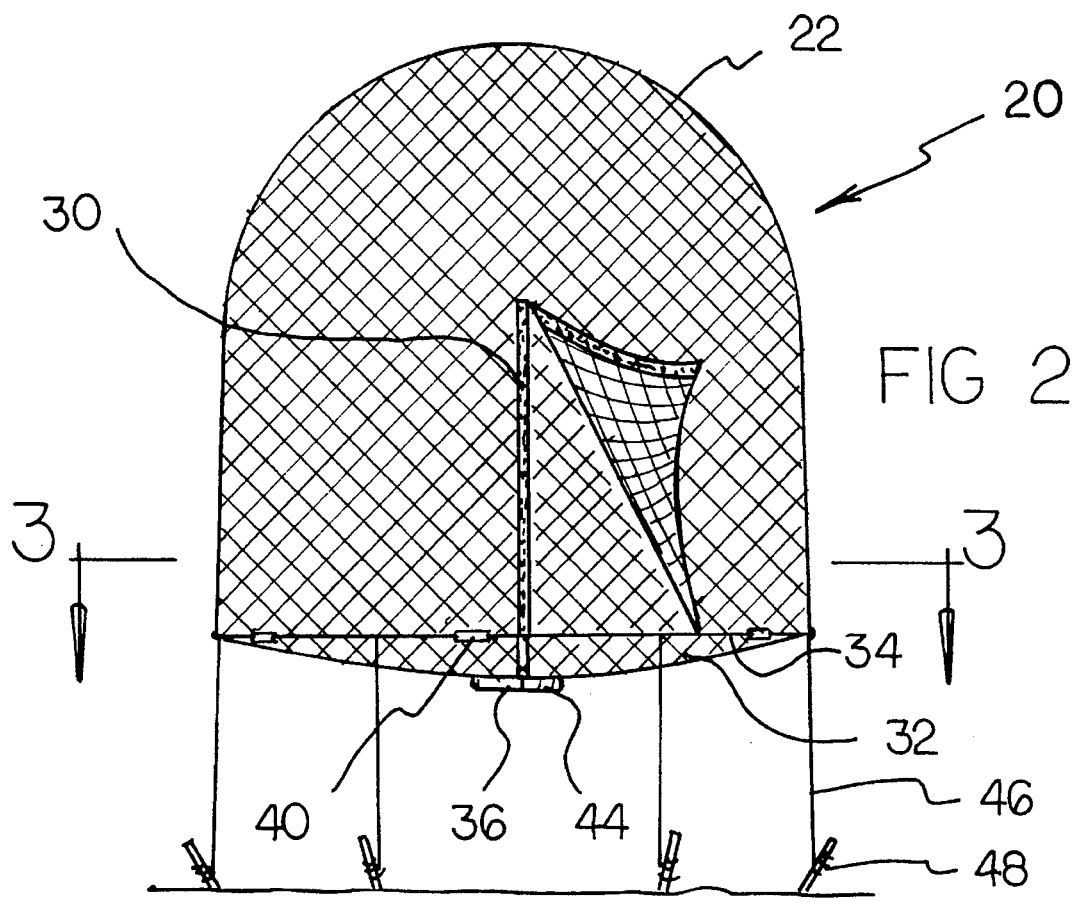
FIG. 2 is a side elevational view of the device of the present invention.
Figure 3:
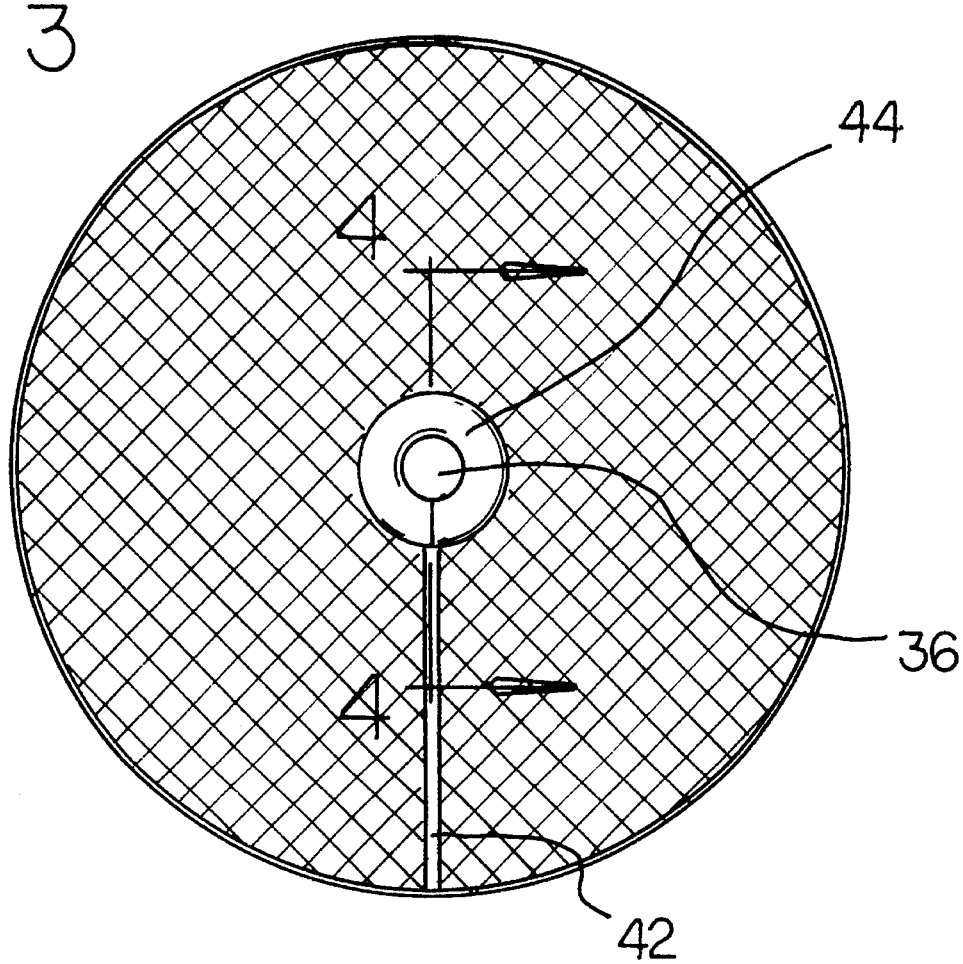
FIG. 3 is a view taken along line 3—3 of FIG. 2.
Figure 4:
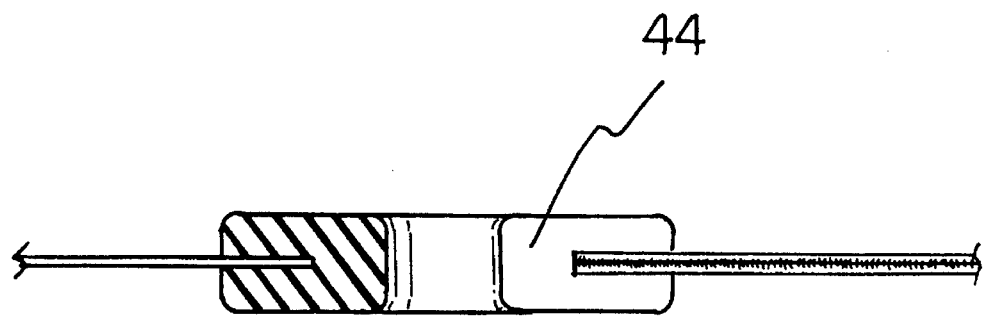
FIG. 4 is a detailed view of the foam ring of the present invention.
Figure 5:
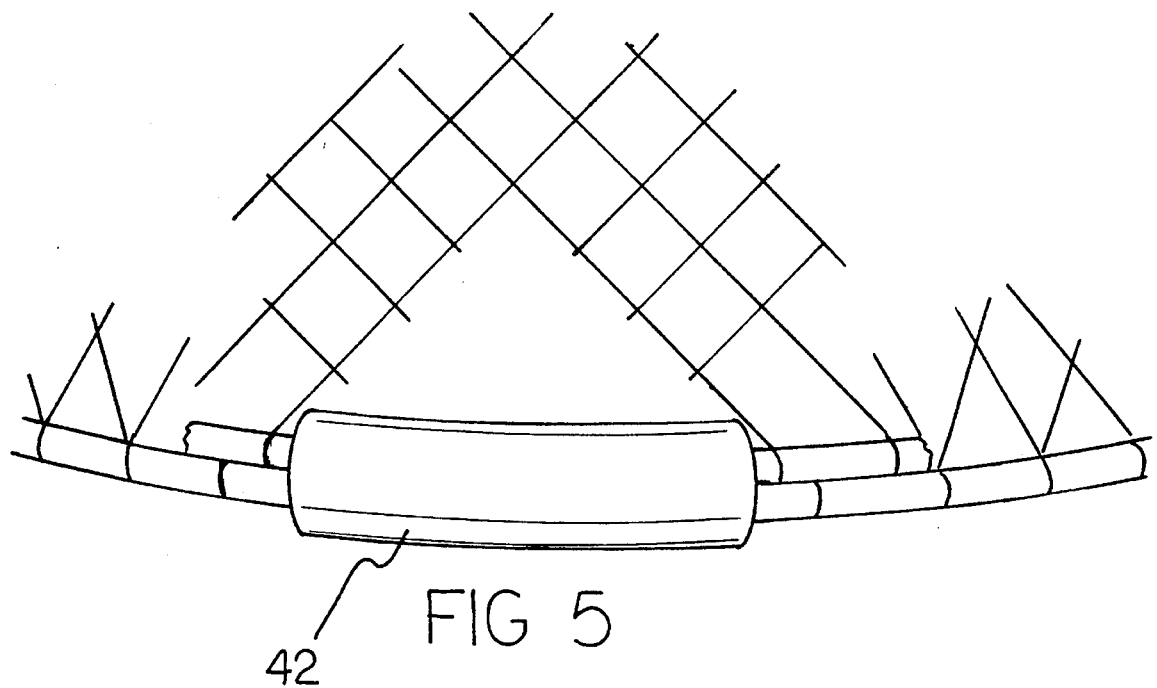
FIG. 5 is a detailed view of securing strap in accordance with the present invention.
Figure 6:
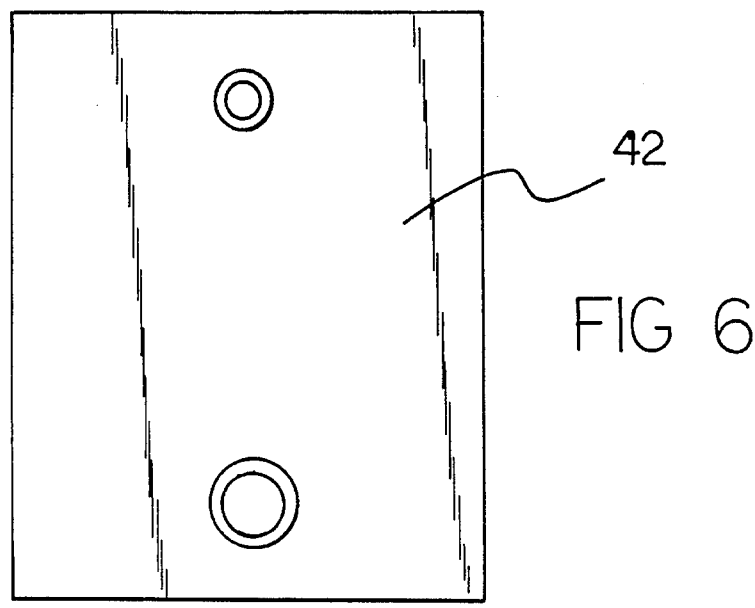
FIG. 6 is a detailed view of the strap of FIG. 5.
Figure 7:
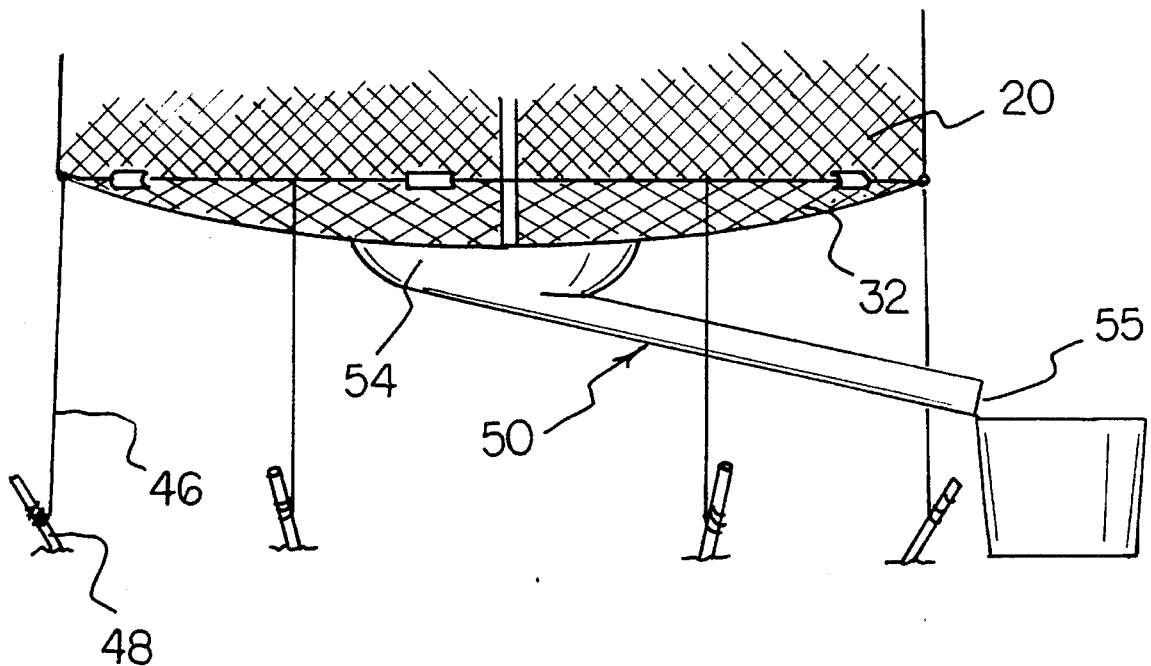
FIG. 7 is a view of the chute for use in conjunction with the second embodiment of the present invention.
Figure 8:
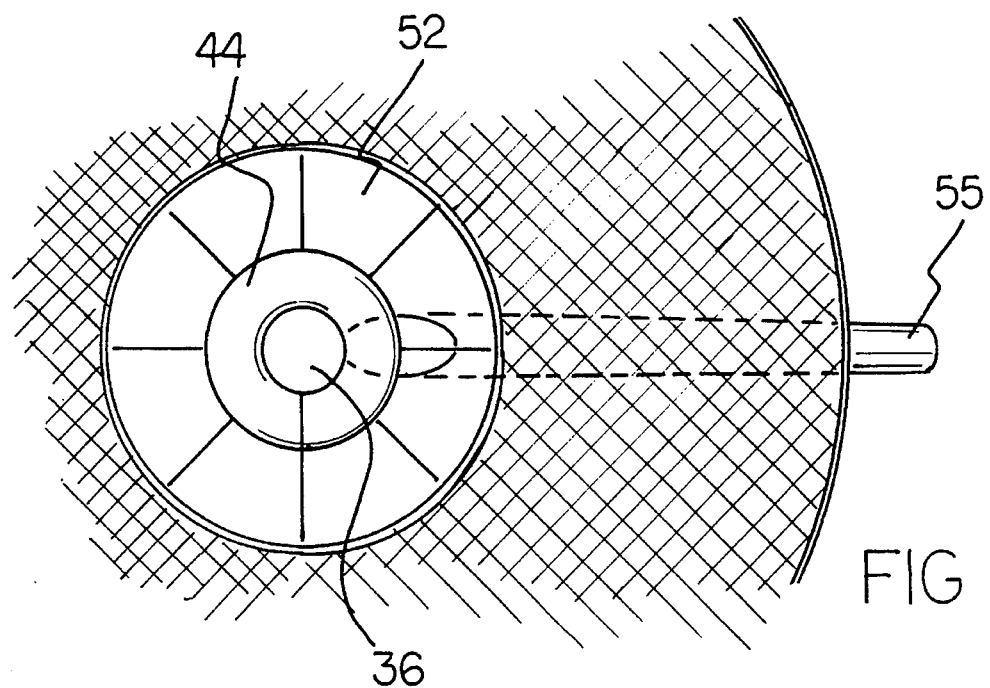
FIG. 8 is a view taken along line 8—8 of FIG. 7.

With reference now to the drawings, and in particular to FIG. 1 thereof, the preferred embodiment of the new and improved tree crop catch embodying the principles and concepts of the present invention and generally designated by the reference numeral 10 will be described.

The present invention relates to a device for use in catching and protecting the fruit in trees. In its broadest context, the device of the present invention includes a mesh dome 20 for use in covering and protecting the fruit tree, and a mesh dish-shaped trampoline 32 for use in catching fruit which falls from the tree. The details of the various components, the manner in which they interrelate, and other embodiments will be described hereinafter.

The first component of the invention is the mesh dome 20. The size of the mesh employed in the dome is such that birds or other animals cannot reach or disturb the fruit of the tree. The mesh dome 20 is conical in shape and formed primarily from a nylon material. However, other resilient plastic materials would suffice. The dome is formed from a rounded closed top 22 and an open bottom 24, with the open bottom 24 defining a circumference 26. A nylon rope is secured about the circumference of the mesh dome 20. A slit 28 serves to define an opening to the mesh dome 20. This opening can be employed in retrieving fallen fruit from the mesh dish 32. The slit 28 is perpendicular to the circumference 26 of the open bottom 24. Furthermore, hook and pile fasteners 30 can be positioned upon the length of the slit 28. The hook and pile fasteners 30 would be employed in keeping the slit 28 in a closed orientation.

The second major component of the present invention is a circular mesh dish 32. The mesh size of the dish is such that the fruit of the tree cannot pass therethrough. As with the mesh dome 20, the mesh dish 32 is primarily constructed from a nylon material. However, other resilient plastic materials would suffice. The dish is defined by an outer circumference 34 and an inner centrally located aperture 36. A slit 38 can be included along a radius of the dish. The slit 38 would include a hook and pile fastener and be employed in varying the size of the dish. However, in the preferred embodiment no slit is included. Thus, in the preferred embodiment the mesh dish 32 and dome would come in standard sizes to fit various types of trees. In order to fit the dish to the dome the outer circumference 34 of the mesh dish 32 matches the circumference 26 of the open bottom 24 of the mesh dome 20. Furthermore a nylon rope is secured to the outer circumference 34 of the mesh dish 32 and means for securing 40 are discretely positioned about the outer circumference 34 of the mesh dish 32. The means for securing 40 functions to secure the outer circumference 34 of the mesh dish 32 to the circumference 26 of the open bottom 24 of the mesh dome 20. This means for securing 40, in the preferred embodiment, takes the form of a strap 42 which can be employed to secure an area of the circumference 26 of the dome to an area of the circumference of the dish. Furthermore, the strap 42 includes releasable fasteners such as snaps or hook and pile fasteners for use in releasably securing the strap 42 to the dome and dish.

A nylon covered foam ring 44 is positioned within the centrally located aperture 36 of the circular nylon mesh dish 32. This foam ring 44 is adapted to be secured about the trunk of a tree. The foam is employed in order to avoid any damage to the trunk of the tree.

A plurality of cords 46 and stakes 48 are used in securing the device to the ground. Each of the cord depends from the outer circumference 34 of the mesh dish 32. Furthermore, each cord has a first end secured to the outer circumference 34 of the mesh dish 32 and a second end. Each of the stakes 48 is secured to the second end of one of the cords 46. The stakes 48 are adapted to be inserted into the ground thereby securing the mesh dish 32, and the mesh dome 20 to the ground.

In an alternative embodiment of the present invention a fruit catching chute 50 is employed. In order for the chute 50 to be used a fruit passage area 52 is needed within the mesh dish 32. The fruit passage area 52 surrounds the centrally located aperture 36 and is of an area to allow a substantial rate of fruit passage. Additionally, the fruit passage area 52 is defined by a mesh which allows the fruit of the tree to pass therethrough. The chute 50 of the second embodiment includes a bowl-shaped receiving end 54 and a dispensing end 55. The bowl-shaped receiving end 54 is adapted to be engaged with the fruit passage area 52 of the mesh dish 32. The chute 50 functions such that when fruit falls from the tree it lands upon the mesh dish 32 and rolls down into the fruit passage area 52, through the fruit passage area 52 and into the bowl-shaped receiving end 54 of the chute 50 and out the dispensing end 55 of the chute 50.

Thus, what has been described is a device for fruit trees consisting of a tree bonnet to protect the fruit from birds, and a net to catch the fruit. It consists of a hemisphere-shaped nylon mesh bonnet and a circular trampoline-like net. The bonnet has an access door near its bottom that is secured by hook and loop material strips and attaches to the mesh net with nylon rope or vinyl wraparound straps with snaps. The net is circular with a hole in its center for the trunk and a vinyl covered foam ring to protect the truck. The outside perimeter consists of a vinyl-covered nylon rope. A slit opening is positioned on one side, to enable easy installation around the trunk. The net edges are clamped to the side of a pot or secured to the ground by steel stakes. A small net with a long handle is provided to retrieve the fruit from the trampoline. A chute device attached to a basket could be used for nut crops. This device could be made in various sized depending on the tree. The bonnet is installed over the top of the tree, and the net is positioned under the branches, and the two are fastened to each other and to the ground or a pot. To retrieve the fruit, the bonnet's access door is opened. This net protects fruit trees from birds and catches tree-ripened fruit when it falls so it does not become bruised.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device adapted to be secured to the trunk of a tree, the device serving to catch the fruit from the trees and protect the fruit from animals, the device comprising, in combination:

a conical nylon mesh dome having a rounded closed top and an open bottom, the open bottom defining a circumference, a slit defining an opening to the mesh dome, the slit being perpendicular to the circumference of the open bottom, hook and pile fasteners associated with the slit for use in keeping the slit in a closed orientation;

a circular nylon mesh dish having an outer circumference and an inner centrally located aperture, a fruit passage area surrounding the centrally located aperture, the fruit passage area being defined by a mesh which allows the fruit of the tree to pass therethrough, the outer circumference of the mesh dish matching the circumference of the open bottom of the mesh dome, a nylon rope secured to the outer circumference of the mesh dish, means for securing discretely positioned about the outer circumference of the mesh dish, the means for securing functioning to secure the outer circumference of the mesh dish to the circumference of the open bottom of the mesh dome;

a nylon covered foam ring positioned within the centrally located aperture of the circular nylon mesh dish, the foam ring adapted to be secured about the trunk of a tree;

a plurality of cords depending from the outer circumference of the mesh dish, each cord having a first end secured to the outer circumference of the mesh dish and a second end, a plurality of stakes with each of the stakes being secured to the second end of one of the cords, the stakes adapted to be inserted into the ground thereby securing the mesh dish, and the mesh dome to the ground; and a chute having a bowl-shaped receiving end and a dispensing end, the bowl-shaped receiving end adapted to be engaged with the fruit passage area of the mesh dish, the chute functioning such that when fruit falls from the tree it lands upon the mesh dish and rolls down into the fruit passage area, through the fruit passage area and into the bowl-shaped receiving end of the chute and out the dispensing end of the chute.

2. A device adapted to be secured to the trunk of a tree, the device serving to catch the fruit from the trees and protect the fruit from animals, the device comprising:

a mesh dome having a rounded closed top and an open bottom, the open bottom defining a circumference, a slit defining an opening to the mesh dome, the slit being perpendicular to the circumference of the open bottom;

a circular mesh dish having an outer circumference and an inner centrally located aperture, the outer circumference of the mesh dish matching the circumference of the open bottom of the mesh dome, means for securing discretely positioned about the outer circumference of the mesh dish, the means for securing functioning to secure the outer circumference of the mesh dish to the circumference of the open bottom of the mesh dome;

a foam ring positioned within the centrally located aperture of the circular mesh dish, the foam ring adapted to be secured about the trunk of a tree; and a plurality cords depending from the outer circumference of the mesh dish, each cord having a first end secured to the outer circumference of the mesh dish and a second end, a plurality of stakes with each of the stakes being secured to the second end of one of the cords, the stakes adapted to be inserted into the ground thereby securing the mesh dish, and the mesh dome to the ground.

3. The device as described in claim 2 wherein:

the mesh dome is constructed primarily from a nylon material;

the mesh dish is constructed primarily from a nylon material, and;

the foam ring is covered by a nylon material.

4. The device as described in claim 2 wherein:

a fruit passage area is defined surrounding the centrally located aperture of the mesh dish, the fruit passage area being defined by a mesh which allows the fruit of the tree to pass therethrough.

5. The device as described in claim 4 further including:

a chute having a bowl-shaped receiving end and a dispensing end, the bowl-shaped receiving end adapted to be engaged with the fruit passage area of the mesh dish, the chute functioning such that when fruit falls from the tree it lands upon the mesh dish and rolls down into the fruit passage area, through the fruit passage area and into the bowl shaped receiving end of the chute and out the dispensing end of the chute.

* * * * *